US006858555B2

(12) United States Patent
Shibasaki et al.

(10) Patent No.: US 6,858,555 B2
(45) Date of Patent: Feb. 22, 2005

(54) PROCESS FOR MAKING A CATALYST FOR CRACKING HEAVY OIL

(75) Inventors: Masato Shibasaki, Saitama (JP); Nobuo Ootake, Saitama (JP)

(73) Assignee: ExxonMobil Research and Engineering Company, Annandale, NJ (US)

( * ) Notice: Subject to any disclaimer, the term of this patent is extended or adjusted under 35 U.S.C. 154(b) by 228 days.

(21) Appl. No.: 10/272,612

(22) Filed: Oct. 15, 2002

(65) Prior Publication Data

US 2003/0047586 A1 Mar. 13, 2003

Related U.S. Application Data

(62) Division of application No. 09/096,601, filed on Jun. 12, 1998, now Pat. No. 6,511,933.

(30) Foreign Application Priority Data

Jun. 13, 1997 (JP) .............................................. 9-173081

(51) Int. Cl.$^7$ ......................... B01J 29/06; B01J 29/18; B01J 29/08; B01J 21/16

(52) U.S. Cl. ............... 502/64; 502/68; 502/71; 502/77; 502/78; 502/79; 502/84

(58) Field of Search .............................. 502/64, 68, 71, 502/77, 78, 79, 84

(56) References Cited

U.S. PATENT DOCUMENTS

| | | | | |
|---|---|---|---|---|
| 4,480,047 A | * | 10/1984 | Beck et al. ................... 502/65 |
| 5,304,601 A | * | 4/1994 | Des Courieres et al. ...... 502/66 |
| 5,393,410 A | * | 2/1995 | Habib et al. ............. 208/111.3 |
| 5,506,182 A | * | 4/1996 | Yamagishi et al. ........... 502/66 |
| 5,762,902 A | * | 6/1998 | Benazzi et al. ............. 423/700 |

* cited by examiner

*Primary Examiner*—Cam N. Nguyen
(74) *Attorney, Agent, or Firm*—Erika S. Wilson; Jeremy J. Kliebert

(57) ABSTRACT

A catalyst composition for the cracking of heavy oil, which has high cracking activity for heavy components in the heavy oil and features reduced deposition of coke. The catalyst composition is comprised of a zeolite, a mixed metal oxide, clay and a metal oxide, and the total acidity of a portion of said catalyst, said portion being composed of said catalyst components other than said zeolite, is from 0.02 to 0.08 mmol/g.

10 Claims, No Drawings

PROCESS FOR MAKING A CATALYST FOR CRACKING HEAVY OIL

CROSS REFERENCE TO RELATED APPLICATIONS

This patent application is a divisional of U.S. patent application Ser. No. 09/096,601 filed Jun. 12, 1998, now U.S. Pat. No. 6,511,933, which claims the priority of Japanese Patent Application No. HEI 09-173081 filed Jun. 13, 1997.

FIELD OF THE INVENTION

This invention relates to an additive to a fluidized catalytic cracking for heavy oil.

BACKGROUND OF THE INVENTION

A variety of methods are known for obtaining light oil by cracking heavy oil, such as fluidized catalytic cracking (FCC). A great deal of research has been conducted to achieve high yields of the desirable light oil products. It is known to add and mix a catalyst, which acts to promote cracking of heavy components in heavy oil, with a cracking catalyst to improve the yield of light oil.

As such additive catalysts, those composed of alumina, clay and silica have been known to date. However, these additive catalysts are typically accompanied by a problems, such as the cracking of heavy oil not being promoted or the formation of undesirable amounts of coke.

An object of the present invention is to provide an additive catalyst for the cracking of heavy oil, which has relatively high cracking activity for heavy components in the heavy oil with reduced coke deposition.

With a view to attaining the above-described object, the present inventors have proceeded with extensive research, leading to the completion of the present invention.

SUMMARY OF THE INVENTION

In accordance with the present invention, there is thus provided an additive catalyst for the catalytic cracking of heavy oil, characterized in that the additive catalyst comprises a large pore zeolite, a mixed metal oxide, clay and a metal oxide, and the total acidity of a portion of said catalyst, said portion being composed of said catalyst components other than said zeolite, is from 0.02 to 0.08 mmol/g.

DETAILED DESCRIPTION OF THE INVENTION

Specific examples of the mixed metal oxides employed as a catalyst additive component in the present invention can include silica-alumina and silica-zirconia as preferred examples and also silica-containing mixed metal oxides, such as silica-magnesia, silica-titania and silica-boria. In the case of silica-alumina, it is preferred to use one having a silica content in a range of from about 5 to 30 wt. %, preferably from about 10 to 20 wt. %. A silica content higher than this range results in a catalyst having relatively poor hydrothermal stability, while a silica content lower than the above range leads to a catalyst having relatively low cracking activity for heavy components. Silica-aluminas suitable for use in the present invention have, as expressed in terms of physical properties in their calcined form, a specific surface area ranging from about 250 to 450 m²/g, preferably from about 300 to 400 m²/g, a pore volume from about 0.5 to 1.5 cc/g, preferably from about 0.7 to 1.2 cc/g. It is also preferred to use a silica-alumina having a structure wherein silica is bonded in the form of a layer on a surface of alumina as a core. In the case of silica-zirconia, it is preferred to use one having a silica content in a range of from 5 to 30 wt. %, preferably from 10 to 20 wt. %. A silica content higher than this range results in a catalyst equipped with poorer hydrothermal stability, while a silica content lower than the above range leads to a catalyst having lower cracking activity for heavy components. Silica-zirconias suitable for use in the present invention have, as expressed in terms of physical properties in its calcined form, a specific surface area ranging from about 100 to 400 m²/g, preferably from about 120 to 350 m²/g, a pore volume from about 0.1 to 1.0 cc/g, preferably from about 0.2 to 0.8 cc/g. As silicazirconia, it is also preferred to use one having a structure wherein silica is bonded in the form of a layer on a surface of zirconia as a core. Illustrative of the mixed metal oxide are alumina-magnesia, alumina-calcia and alumina-boria in addition to the above described silica-containing mixed metal oxides. In the case of alumina-boria, the content of alumina may be from about 5 to 95 wt. %, preferably from about 10 to 90 wt. %. It is preferred to use one having a structure wherein boria is bonded in the form of a layer on a surface of alumina as a core.

The mixed metal oxides employed in the present invention generally have a specific surface area from about 250 to 450 m²/g, with 300 to 400 m²/g being preferred, and an overall pore volume of from about 0.5 to 1.5 cc/g, with 0.7 to 1.2 cc/g being preferred. One having relatively large pores in a large proportion in its pore volume distribution is preferred. In the present invention, the pore volume A of pores having diameters from 60 to 200 Å may account for at least 65%, preferably about 75 to 85% of the overall pore volume T, and the pore volume B of pores having diameters of from 100 to 200 A may preferably account for at least 30% of the overall pore volume T. The ratio B/A of the pore volume B to the pore volume A may preferably be at least 0.4, notably 0.45 or greater.

In the mixed metal oxide employed in the present invention, its pore characteristics such as specific surface area and pore volume can be controlled according to conditions for the production of the mixed metal oxide.

The catalyst according to the present invention can be obtained by conventional methods. For example, the catalyst can be obtained by evenly mixing the zeolite, the mixed metal oxide, the metal oxide, and the clay in an aqueous medium and then spray drying the resultant slurry.

Usable examples of the zeolite can include a variety of conventionally known crystalline silicates, for example, crystalline aluminosilicate and aluminometallosilicates containing a metal in their skeleton structures (e.g., crystalline aluminogallosilicate and the like). Particularly preferred are synthetic Y-type zeolite ultrastable Y-type zeolite, ZSM-5 and β-mordenite, all of which are common in crystalline structure with faujasite. It is also preferable to use one containing hydrogen and/or a rare earth metal as cations.

Illustrative of the metal oxide can be silica, alumina, magnesia, zirconia, and titania. Of these, use of silica is preferred.

Examples of the clay can include kaolin, bentonite and *kibushi* clay. Of these, use of kaolin is preferred. In general, one containing as a primary component one or more of clay minerals such as kaolinite, dickite, nacrite, halloysite and hydrated halloysite is used.

In the catalyst of the present invention, the content of the zeolite can be generally from about 1 to 40 wt. %, preferably from about 10 to 30 wt. %; the content of the mixed metal oxide can be generally from about 5 to 80 wt. %, preferably from about 10 to 60 wt. %; the content of the metal oxide can be generally from about 10 to 40 wt. %, preferably from about 15 to 35 wt. %; and the content of the clay can be generally from about 10 to 80 wt. %, preferably from about 20 to 70 wt. %.

In the portion (i.e., matrix portion) of the catalyst according to the present invention, said portion being composed of said catalyst components other than said zeolite, that is, in the portion composed of a mixture of the mixed metal oxide, the metal oxide and the clay, the specific surface area can be from about 35 to 65 m2/g, preferably from about 40 to 60 m2/g, and the overall pore volume can be from about 0.14 to 0.45 ml/g, preferably from about 0.20 to 0.40 ml/g. Further, its pore distribution may preferably be biased toward relatively large pores. The pore volume A of pores having diameters of from about 60 to 200 A may account for at least 45%, preferably 50% or more of the overall pore volume T, and the pore volume B of pores having diameters of from about 100 to 200 A may account for at least 20%, preferably 25% or more of the overall pore volume T. The ratio B/A of the pore volume B to the pore volume A may be at least 0.4, preferably 0.5 or greater.

The pore characteristics of the portion of the catalyst according to the present invention, said portion being formed of the components other than the zeolite, can be controlled by the kind and content of the mixed metal oxide and can also be controlled by the mixing proportions of the mixed metal oxide, the metal oxide and the clay, production conditions for the catalyst, and the like.

In the catalyst according to the present invention, the total acidity of the portion composed of the catalyst components other than the zeolite is specified to range from about 0.02 to 0.08 mmol/g, with 0.025 to 0.07 mmol/g being preferred. This makes it possible to suppress the deposition of coke and also to obtain middle distillate at a high yield in catalytic cracking of heavy oil. This total acidity can be easily controlled by adjusting the kind, composition and/or the like of the matrix portion formed of the mixed metal oxide, the metal oxide and the clay as the catalyst components other than the zeolite.

For the preferred production of the catalyst of this invention, a gel of the zeolite, the clay and the mixed metal oxide is added to a sol solution of the metal oxide such as a silica sol solution, and the resulting mixture is uniformly stirred to prepare a dispersion. In this case, the average particle of the zeolite can be from 0.1 to 1 $\mu$m; the average particle size of the clay can be from about 0.5 to 5 $\mu$m, with 2 to 3 $\mu$m being preferred; and the average particle size of the mixed metal oxide can be from about 0.5 to 10 $\mu$m, with 3 to 7 $\mu$m being preferred. Further, the total solid concentration of the dispersion can be from about 10 to 50 wt. %. with 20 to 30 wt. % being preferred.

The dispersion prepared as described above is next spray dried. Its drying temperature is from about 180 to 300° C., preferably from about 200 to 270° C. By this spray drying, the catalyst of the present invention is obtained in the form of a powder. The average particle size of this powder ranges from about 50 to 80 $\mu$m, with 55 to 70 $\mu$m being preferred. The dry product obtained as described above can be used after heating it to about 300 to 700° C., preferably about 400 to 600° C. as needed. Moreover, this powdery catalyst can be formed, if needed, by extrusion or the like into a formed product of a granular, spherical, cylindrical, rod-like or similar shape.

The catalyst according to the present invention can be used by dispersing it in the form of fine powder in heavy oil. As an alternative, it can be employed by mixing the same in a conventionally-known cracking catalyst for heavy oil. Preferably, the catalyst of the present invention can be used by mixing it in the form of powder in an FCC catalyst. An FCC catalyst is composed of a porous inorganic oxide and zeolite. Usable examples of the porous inorganic oxide can include silica-alumina, silica-zirconia, and silicamagnesia. The catalyst according to the present invention can preferably be applied to FCC catalysts, especially, those composed of zeolite, silica, alumina and kaolin. The content of the catalyst of this invention in each FCC catalyst may range from 2 to 30 parts by weight, preferably form 4 to 20 parts by weight per 100 parts by weight of the FCC catalyst.

When catalytically cracking heavy oil by using such an FCC catalyst, the reaction temperature may range from 470 to 550° C., preferably from 480 to 520° C. The catalyst/oil ratio can be from 3 to 6 wt/wt, preferably from 4 to 5 wt/wt.

Usable examples of the heavy oil can include various feed oils as well as their atmospheric distillation residues and vacuum distillation residues. In addition, solvent-deasphalted oil, solvent-deasphalted asphalt, shale oil, tar sand oil, liquefied coal oil and the like can also be used. It is also possible to use those available by blending vacuum gas oil (boiling point range: 343 to 600° C.) in the above-described heavy oils.

As the total acidity of the portion (matrix portion) of the catalyst components other than the zeolite is limited to the specific range, the catalyst according to the present invention has excellent cracking activity for heavy oil. By conducting a catalytic cracking reaction of heavy oil with the catalyst of this invention added therein, naphtha and middle distillate can be obtained in high yields. Moreover, the deposition of coke can be significantly reduced in the catalytic cracking of heavy oil, thereby achieving prolongation in the service life of a cracking catalyst.

EXAMPLES

The present invention will next be described in further detail by Examples.

Incidentally, the specific surface area and total acidity of a catalyst are defined as follows:

Specific Surface Area

A sample (0.2 g) was maintained for 1 hour under the conditions of 200° C. and $1\times10^{-3}$ torr and was then allowed to adsorb nitrogen gas at the liquid nitrogen temperature (77K). Using the quantity of nitrogen gas so adsorbed, the specific surface area was determined. The BET method was used for the calculation of the specific surface area.

Total Acidity

A sample (0.5 g) was maintained for 4 hours under the conditions of 400° C. and $1\times10^{-4}$ torr and was then allowed to adsorb ammonia gas. Heat of adsorption produced during the adsorption was measured. A quantity of adsorbed ammonia corresponding to heat of adsorption in excess of 70 KJ/mol was defined as a total acidity. Incidentally, the measurement was performed using an "Adsorption Heat Measuring Instrument" manufactured by K.K. Tokyo Riko.

Referential Example 1

(Production of $SiO_2$—$Al_2O_3$)

An aqueous solution (2 N) of ammonium hydroxide was added to 7,000 g of a 3 wt. % aqueous solution of aluminum sulfate having an $Al_2O_3$ concentration of 1.3 wt. % (pH 3), whereby an aqueous slurry containing aluminum hydroxide, the pH of which was 8.2, was obtained.

On the other hand, 2 N sulfuric acid was added to 170 g of an aqueous solution of water glass (pH 12), which had an $SiO_2$ content of 5.8 wt. %, so that the pH was adjusted to 3.0 to obtain a silica sol solution.

Next, the aqueous slurry of aluminum hydroxide, which had been obtained as described above, was added to and mixed with the silica sol solution under stirring. A 2 N aqueous solution of ammonium hydroxide was added to the resultant mixture to adjust its pH to 8.2.

The thus-obtained mixture was next allowed to age at 25° C. for 3 hours to gelatinize the silica sol contained in the mixture, thereby obtaining a gel with silica gel adhered and bonded on surfaces of aluminum hydroxide particles. The gel was separated from the solution, washed with water and then collected by filtration. The gel so obtained was used as an additive component. The $SiO_2/Al_2O_3$ weight ratio of the gel was 0.11, and its $SiO_2$ content was 10 wt. %. Further, a portion of dry particles, which had been obtained by drying the gel at 120° C., was calcined at 500° C. for 3 hours. This calcined product had a surface area of 230 $m^2/g$ and a pore volume of 1.2 cc/g.

Example 1
(Production of Catalyst A)

2 N sulfuric acid was added to 660 g of an aqueous solution of water glass (pH 12), which had an $SiO_2$ content of 15.2 wt. %, so that the pH was adjusted to 3 to obtain a silica sol solution.

To 1,180 g of the silica sol solution, Y-type zeolite, kaolin and the $SiO_2$—$Al_2O_3$ gel obtained in Referential Example 1 were next added in the proportions shown in Table 1. Subsequent to uniform dispersion, the resulting dispersion was spray dried so that a catalyst A having an average particle size of 60 μm was obtained. As the composition of the catalyst A, it was composed of 20 wt. % zeolite, 20 wt. % silicaalumina, 40 wt. % kaolin and 20 wt. % silica. Further, its silicon content other than that contained in the kaolin was 21 wt. % in terms of $SiO_2$.

The total acidity of the matrix portion (i.e., the portion other than the zeolite) of the catalyst was 0.02 mmol/g.

Example 2
(Production of Catalysts B to F)

Catalysts B to F were produced in a similar manner as in Example 1 except that the $SiO_2$ content of the silica-alumina prepared in a similar manner as in Referential Example 1 and the amounts of the silica sol solution, the Y-type zeolite, the kaolin and the silica-alumina were changed in various ways. Their compositions and physical properties are presented in Table 1, along with the composition and physical properties of the catalyst A obtained in Example 1.

TABLE 1

| Catalyst | | A | B | C | D | E* | F* |
|---|---|---|---|---|---|---|---|
| $SiO_2$ content other than kaolin (as $SiO_2$) (wt. %) | | 5 | 10 | 10 | 15 | 0 | 40 |
| Composition (wt. %) | Zeolite | 20 | 20 | 20 | 20 | 20 | 20 |
| | Silica-alumina | 20 | 20 | 20 | 20 | 5 | 20 |
| | Kaolin | 40 | 40 | 30 | 40 | 55 | 40 |
| | Silica | 20 | 20 | 20 | 20 | 20 | 20 |
| Matrix portion | | | | | | | |
| Specific surface area ($m_2/g$) | | 35 | 60 | 75 | 80 | 20 | 108 |
| Total acidity (mmol/g) | | 0.02 | 0.04 | 0.08 | 0.08 | 0.01 | 0.15 |
| Silicon content other than kaolin (as $SiO_2$) (wt. %) | | 21 | 22 | 23 | 23 | 20 | 28 |

*Comparative Examples

Example 3
(Production of Catalysts G to L)

Catalysts G to L were produced in a similar manner as in Example 1 and Example 2 except that ZSM-5 type zeolite was used instead of the Y-type zeolite.

Concerning these catalysts G to L, their compositions and physical properties are presented in Table 2.

TABLE 2

| Catalyst | | G | H | I | J | K* | L* |
|---|---|---|---|---|---|---|---|
| $SiO_2$ content in silica-alumina (wt. %) | | 5 | 10 | 10 | 15 | 0 | 40 |
| Composition (wt.%) | Zeolite | 10 | 10 | 10 | 10 | 10 | 10 |
| | Silica-alumina | 20 | 20 | 30 | 20 | 5 | 20 |
| | Kaolin | 50 | 50 | 40 | 50 | 65 | 50 |
| | Silica | 20 | 20 | 20 | 20 | 20 | 20 |
| Matrix portion | | | | | | | |
| Specific surface area (m2/g) | | 35 | 65 | 73 | 80 | 20 | 118 |
| Total acidity (mmol/g) | | 0.02 | 0.05 | 0.07 | 0.08 | 0.01 | 0.17 |
| Silicon content other than kaolin (as $SiO_2$) (wt. %) | | 21 | 22 | 23 | 23 | 20 | 28 |

*Comparative Examples

Application Example 1
(Cracking of Heavy Oil)

To conduct performance tests of the various additive catalysts obtained in Examples 1 and 2, the individual additive catalysts were uniformly mixed in portions of an FCC catalyst. Using a microactivity test (MAT) apparatus, predetermined amounts of a feed heavy oil were respectively subjected to a fluidized catalytic cracking reaction in the presence of the thus-prepared catalyst mixtures under the same conditions. The results are presented in Table 3.

Using as references the results of a reaction conducted in the presence of the same FCC catalyst without addition of any additive catalyst, the values in the table were all obtained by subtracting reference values from the results of the respective reactions conducted in the presence of the catalyst compositions making use of the individual additive catalysts. Further, the performance values other than the conversions are values obtained at the same conversion.

As the feed heavy oil, desulfurized vacuum gas oil (VGO) was used. Further, prior to the test, the additive catalysts were calcined at 650° C. for 1 hour and were then treated at 760° C. for 16 hours in a 100% steam atmosphere.

The fluidized catalytic cracking conditions in the test were as follows:

(1) Reaction temperature: 510° C.

(2) Reaction pressure: atmospheric pressure (3) Catalyst/oil ratio: 2.5 to 4.5 wt/wt (4) WHW: 32 $hr^{-1}$ The additive catalysts A to F were each added the corresponding portions of the FCC catalyst in a proportion of 10 parts by weight per 100 parts by weight of the FCC catalyst.

Incidentally, the conversions, naphtha yields, bottom yields and coke yields presented in Table 3 and Table 4 are defined by the following formulas, respectively:

$$\text{Conversion (wt. \%)} = (A-B)/A \times 100 \quad (1)$$

A: Weight of the feed oil.

B: Weight of distillates contained in the produced oil and having boiling points of 221° C. and higher.

$$\text{Naphtha yield (wt. \%)} = C/A \times 100 \quad (2)$$

C: Weight of naphtha (boiling point range: C~to 221° C.) in the produced oil.

Bottom yield (wt. %)=D/A×100 (3)

D: Weight of a bottom (boiling point range: 343° C. and higher) in the produced oil.

Coke yield (wt. %)=E/A×100 (4)

E: Weight of coke deposited on the catalyst composition.

TABLE 3

| Catalyst No. | A | B | C | D | E* | F* |
|---|---|---|---|---|---|---|
| Reaction results | | | | | | |
| Conversion (wt. %) | +1.8 | +0.7 | +1.0 | +1.0 | −0.3 | −1.0 |
| Naphtha yield (wt. %) | +1.4 | +0.7 | +0.5 | +0.4 | ±0 | −0.4 |
| Bottom yield (wt. %) | −0.5 | −0.8 | −1.0 | −0.4 | ±0 | +0.5 |
| Coke yield (wt. %) | −0.3 | −0.4 | −0.2 | −0.3 | ±0 | +0.5 |

*Comparative Examples

Application Example 2

Experiments were conducted in a similar manner a~in Application Example 1 except that, as the additive catalysts, those obtained in Example 3 were used. The results are presented in Table 4.

TABLE 4

| Catalyst No. | G | H | I | J | K* | L* |
|---|---|---|---|---|---|---|
| Reaction results | | | | | | |
| Conversion (wt. %) | +1.5 | +0.5 | +0.9 | +0.9 | −0.3 | −1.5 |
| Naphtha yield (wt. %) | +1.0 | +0.5 | +0.4 | +0.2 | −0.5 | −0.7 |
| Bottom yield (wt. %) | −0.5 | −0.7 | −0.9 | −0.4 | +0.1 | +0.7 |
| Coke yield (wt. %) | −0.3 | −0.4 | −0.2 | −0.3 | 0 | +0.6 |

*Comparative Examples

What is claimed is:

1. A process for preparing a catalyst comprising:
   (a) mixing:
      (i) a zeolite;
      (ii) a mixed metal oxide selected from the group consisting of silica-alumina, silica-zirconia, silica-magnesia, silica-titania, silica-boria, alumina-calcia, alumina-boria and alumina-magnesia, wherein the silica content of said mixed metal oxide is from about 5 to about 30 wt. %;
      (iii) a clay;
      (iv) and a metal oxide selected from the group consisting of silica, alumina, titania, boria, magnesia, calcia, and zirconia; and,
   (b) controlling the amounts of said mixed metal oxide, said clay and said metal oxide so that the total acidity of the catalyst components other than said zeolite is from 0.02 to 0.08 mmol/g.

2. The process according to claim 1 comprising mixing between about 1 and about 40 wt. % of zeolite.

3. The process according to claim 1 comprising mixing between about 5 and about 80 wt. % of mixed metal oxide.

4. The process according to claim 1 comprising mixing between about 10 and about 80 wt. % of clay.

5. The process according to claim 1 comprising mixing between about 1 and about 40 wt. % of zeolite, between about 5 and about 80 wt. % of mixed metal oxide, and between about 10 and about 80 wt. % of clay.

6. The process according to claim 1 wherein the zeolite is a faujasite zeolite selected from the group consisting of zeolite Y, ultrastable Y zeolites, ZSM-5, and β-mordenite.

7. The process according to claim 1 wherein the clay is selected from the group consisting of kaolin, bentonite and kibushi clay.

8. A process for preparing a catalyst comprising:
   (a) mixing:
      (i) between about 10 and about 40 wt. % of zeolite, wherein said zeolite is a faujasite zeolite selected from the group consisting of zeolite Y, ultrastable Y zeolites, ZSM-5, and β-mordenite;
      (ii) between about 5 and about 80 wt. % of a mixed metal oxide, wherein said mixed metal oxide is selected from the group consisting of silica-alumina, silica-zirconia, silica-magnesia, silica-titania, silica-boria, alumina-calcia, alumina-boria and alumina-magnesia, and wherein the silica content of said mixed metal oxide is from about 5 to about 30 wt. %;
      (iii) between about 10 and about 80 wt. % of clay, wherein said clay is selected from the group consisting of kaolin, bentonite and kibushi clay;
      (iv) and a metal oxide selected from the group consisting of silica, alumina, titania, boria, magnesia, calcia, and zirconia; and,
   (b) controlling the amounts of said mixed metal oxide, said clay and said metal oxide so that the total acidity of the catalyst components other than said zeolite is from 0.02 to 0.08 mmol/g.

9. A process for preparing a catalyst comprising:
   (a) mixing:
      (i) a zeolite;
      (ii) a mixed metal oxide selected from the group consisting of silica-alumina, silica-zirconia, silica-magnesia, silica-titania, silica-boria, alumina-calcia, alumina-boria and alumina-magnesia;
      (iii) a clay;
      (iv) and a metal oxide selected from the group consisting of silica, alumina, titania, boria, magnesia, calcia, and zirconia; and,
   (b) controlling the amounts of said mixed metal oxide, said clay and said metal oxide so that the total acidity of the catalyst components other than said zeolite is from 0.02 to 0.08 mmol/g.

10. A catalyst prepared by a process comprising:
   (a) mixing:
      (i) a zeolite;
      (ii) a mixed metal oxide selected from the group consisting of silica-alumina, silica-zirconia, silica-magnesia, silica-titania, silica-boria, alumina-calcia, alumina-boria and alumina-magnesia;
      (iii) a clay;
      (iv) and a metal oxide selected from the group consisting of silica, alumina, titania, boria, magnesia, calcia, and zirconia; and,
   (b) controlling the amounts of said mixed metal oxide, said clay mud said metal oxide so that the total acidity of the catalyst components other than said zeolite is from 0.02 to 0.08 mmol/g;
   wherein the catalyst comprises the zeolite, the mixed metal oxide, the clay, and the metal oxide;
   wherein the total acidity of a portion of said catalyst, said portion is composed of the catalyst components other than the zeolite, is from 0.02 to 0.08 mmol/g; and
   wherein the silica content of said mixed metal oxide is from about 5 to about 30 wt. %.

* * * * *